United States Patent
Beaumont (10) Patent No.: US 7,503,046 B2
(45) Date of Patent: Mar. 10, 2009

(54) METHOD OF OBTAINING INTERLEAVE INTERVAL FOR TWO DATA VALUES

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 1075 days.

(21) Appl. No.: 10/689,280

(22) Filed: Oct. 20, 2003

(65) Prior Publication Data

US 2004/0215838 A1 Oct. 28, 2004

(30) Foreign Application Priority Data

Apr. 23, 2003 (GB) .................................. 0309211.1

(51) Int. Cl.
G06F 9/46 (2006.01)
G06F 15/00 (2006.01)

(52) U.S. Cl. ........................ 718/105; 718/100; 718/104; 712/11; 712/14; 712/28

(58) Field of Classification Search ................... 341/81, 341/94; 380/255; 718/100, 103, 104, 105, 718/1, 102; 712/10, 11, 12, 14, 15, 16, 2, 712/4, 28
See application file for complete search history.

(56) References Cited

U.S. PATENT DOCUMENTS

| | | | |
|---|---|---|---|
| 4,984,189 A * | 1/1991 | Neki ........................... | 708/209 |
| 5,241,677 A | 8/1993 | Naganuma et al. | |
| 5,535,387 A | 7/1996 | Matsouka et al. | |
| 5,581,773 A | 12/1996 | Glover | |
| 5,630,129 A | 5/1997 | Wheat | |
| 5,850,489 A | 12/1998 | Rich | |
| 5,892,517 A | 4/1999 | Rich | |
| 5,966,528 A | 10/1999 | Wilkinson et al. | |
| 6,078,945 A | 6/2000 | Hinsley | |
| 6,219,776 B1 | 4/2001 | Pechanek et al. | |
| 6,279,088 B1 | 8/2001 | Elliott et al. | |
| 6,292,822 B1 | 9/2001 | Hardwick | |

(Continued)

OTHER PUBLICATIONS

Daehyun Kim, Mainak Chaudhuri, and Mark Heinrich, Leveraging Cache Coherence in Active Memory Systems, Proceedings of the 16th ACM Int'l Conference on Supercomputing, pp. 2-13, New York City, USA, Jun. 2002.

(Continued)

*Primary Examiner*—Meng-Ai An
*Assistant Examiner*—Abdullah Al Kawsar
(74) *Attorney, Agent, or Firm*—Jones Day; Edward L. Pencoske (57) ABSTRACT

A method of determining an interleave pattern for n lots of A and y lots of B, when n plus y equals a power of two such that the expression $2^z-n$ may be used to represent the value of y, includes generating a key including the reverse bit order of a serially indexed count from 0 to $2^z$. An interleave pattern can be generated from the key in which all values less than n are replace by A and all other values are replaced by B. The key can be used to generate a table that contains all possible combinations of values of A and B. The table can then be stored such that an interleave pattern can be automatically selected based on either the number of lots of A or the number of lots of B.

16 Claims, 5 Drawing Sheets

U.S. PATENT DOCUMENTS

| | | | |
|---|---|---|---|
| 6,329,935 B1 * | 12/2001 | Stephen ........................ 341/81 |
| 6,363,152 B1 * | 3/2002 | Cornelius et al. ........... 380/255 |
| 6,404,439 B1 | 6/2002 | Coulombe et al. |
| 6,421,772 B1 | 7/2002 | Maeda et al. |
| 6,430,618 B1 | 8/2002 | Karger et al. |
| 6,594,718 B1 * | 7/2003 | Ebner et al. ................. 710/240 |
| 6,617,985 B1 * | 9/2003 | Poeppelman ................. 341/94 |
| 6,647,408 B1 * | 11/2003 | Ricart et al. ................ 718/105 |
| 6,826,753 B1 * | 11/2004 | Dageville et al. ........... 718/102 |
| 7,159,221 B1 * | 1/2007 | Willen et al. ................. 718/104 |
| 7,356,819 B1 * | 4/2008 | Ricart et al. ................. 718/102 |
| 2001/0005853 A1 * | 6/2001 | Parkes et al. ................. 709/106 |

OTHER PUBLICATIONS

Mainak Chaudhuri, Daehyun Kim, and Mark Heinrich, Cache Coherence Protocol Design for Active Memory Systems, Proceedings of the 2002 Int'l Conference on Parallel and Distributed Processing Techniques and Applications, pp. 83-89, Las Vegas, USA, Jun. 2002.

* cited by examiner

| | 3 | 9 | 1 | 7 | 5 | 11 | 0 | 6 | 4 | 10 | 2 | 8 |
|---|---|---|---|---|---|---|---|---|---|---|---|---|
| 0 | A | A | A | A | A | A | A | A | A | A | A | A |
| 1 | A | A | A | A | A | B | A | A | A | A | A | A |
| 2 | A | A | A | A | A | B | A | A | A | B | A | A |
| 3 | A | B | A | A | A | B | A | A | A | B | A | A |
| 4 | A | B | A | A | A | B | A | A | A | B | A | B |
| 5 | A | B | A | B | A | B | A | A | A | B | A | B |
| 6 | A | B | A | B | A | B | A | B | A | B | A | B |
| 7 | A | B | A | B | B | B | A | B | A | B | A | B |
| 8 | A | B | A | B | B | B | A | B | B | B | A | B |
| 9 | B | B | A | B | B | B | A | B | B | B | A | B |
| 10 | B | B | A | B | B | B | A | B | B | B | B | B |
| 11 | B | B | B | B | B | B | A | B | B | B | B | B |
| 12 | B | B | B | B | B | B | B | B | B | B | B | B |

*Fig.8*

METHOD OF OBTAINING INTERLEAVE INTERVAL FOR TWO DATA VALUES

CROSS-REFERENCE TO RELATED APPLICATIONS

The present application is related to U.S. patent application Ser. No. 10/689,336 entitled "Method for Load Balancing a Loop of Parallel Processing Elements" filed 20 Oct. 2003, U.S. patent application Ser. No. 10/689,335 entitled "Method for Using Filtering to Load Balance a Loop of Parallel Processing Elements" filed 20 Oct. 2003, U.S. patent application Ser. No. 10/689,345 entitled "Method for Load Balancing a Line of Parallel Processing Elements" filed 20 Oct. 2003, U.S. patent application Ser. No. 10/689,312 entitled "Method for Using Extrema to Load Balance a Loop of Parallel Processing Elements" filed 20 Oct. 2003, U.S. patent application Ser. No. 10/689,365 entitled "Method for Load Balancing an N-Dimensional Array of Parallel Processing Elements" filed 20 Oct. 2003, and U.S. patent application Ser. No. 10/689,382 entitled "Method for Rounding Values for a Plurality of Parallel Processing Elements" filed 20 Oct. 2003.

BACKGROUND OF THE INVENTION

The present invention is directed generally to interleaving and, more particularly, to the interleaving of two data values.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in $X=Y+Z$, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, Multimedia extensions (MMX) are SIMD; multiple processors (graphics processors, etc) are MIMD; pipelining (especially in graphics accelerators) is MISD. Furthermore, techniques such as out-of-order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

In typical active memories, load balancing (i.e. having each PE perform the same number of tasks) is important to maximize the effectiveness of the active memory. By balancing the load, the amount of time that one or more PEs is idle while waiting for one or more other PEs to complete their assigned tasks is minimized. For load balancing, there is a requirement to distribute T tasks across P PEs or, more generally, P processors. This would give a mean number of tasks $M=T/P$ on each processor. However, in general T/P is not an integer. To preserve the number of tasks T, some processors will be assigned A tasks and some processors will be assigned B tasks, where A=truncated (T/P), and $B=A+1$, and A and B are integers. If the number of processors with A tasks is X, then $T=A \cdot X+B \cdot (P-X)$.

In certain circumstances, it may be desirable to interleave the processors with A tasks and with B tasks. Thus, a need exists for a method of evaluating an interleave pattern for n occurrences of A and y occurrences of B.

BRIEF SUMMARY OF THE INVENTION

The present invention is directed to methods of determining an interleave pattern for n lots of A and y lots of B, when n plus y equals a power of two and when it does not. When n plus y equals a power of two, the expression $2^z-n$ may be used to represent the value of y. The method is comprised of generating a key comprised of the reverse bit order of a serially indexed count from 0 to $2^z$. An interleave pattern can be generated from the key in which all values less than n are replaced by A and all other values are replaced by B.

In cases where n plus y does not equal a power of two, the method is comprised of selecting a value of $2^z$ where, preferably, $(n+y)<2^z<2(n+y)$. A list is created in which the entries are comprised of the reverse bit order of a serially indexed count from 0 to $2^z$. A portion of the list is selected and renumbered to form a key. An interleave pattern can be generated from the key in which all values in the key less than n are replaced by A and all other values in the key are replaced by B.

In both cases, the keys can be used to generate a table that contains all possible combinations of values of A and B. The table can then be stored such that an interleave pattern can be automatically selected based on either the number of lots of A or the number of lots of B. The method of the present invention, although simple to implement, provides a near optimal interleave pattern for most cases. The present invention contemplates hardware, e.g., memory containing an ordered set of instructions, for carrying out the disclosed methods. Those advantages and benefits, and others, will be apparent from the Detailed Description of the Invention herein below.

BRIEF DESCRIPTION OF THE DRAWINGS

For the present invention to be easily understood and readily practiced, the present invention will now be described, for purposes of illustration and not limitation, in conjunction with the following figures, wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
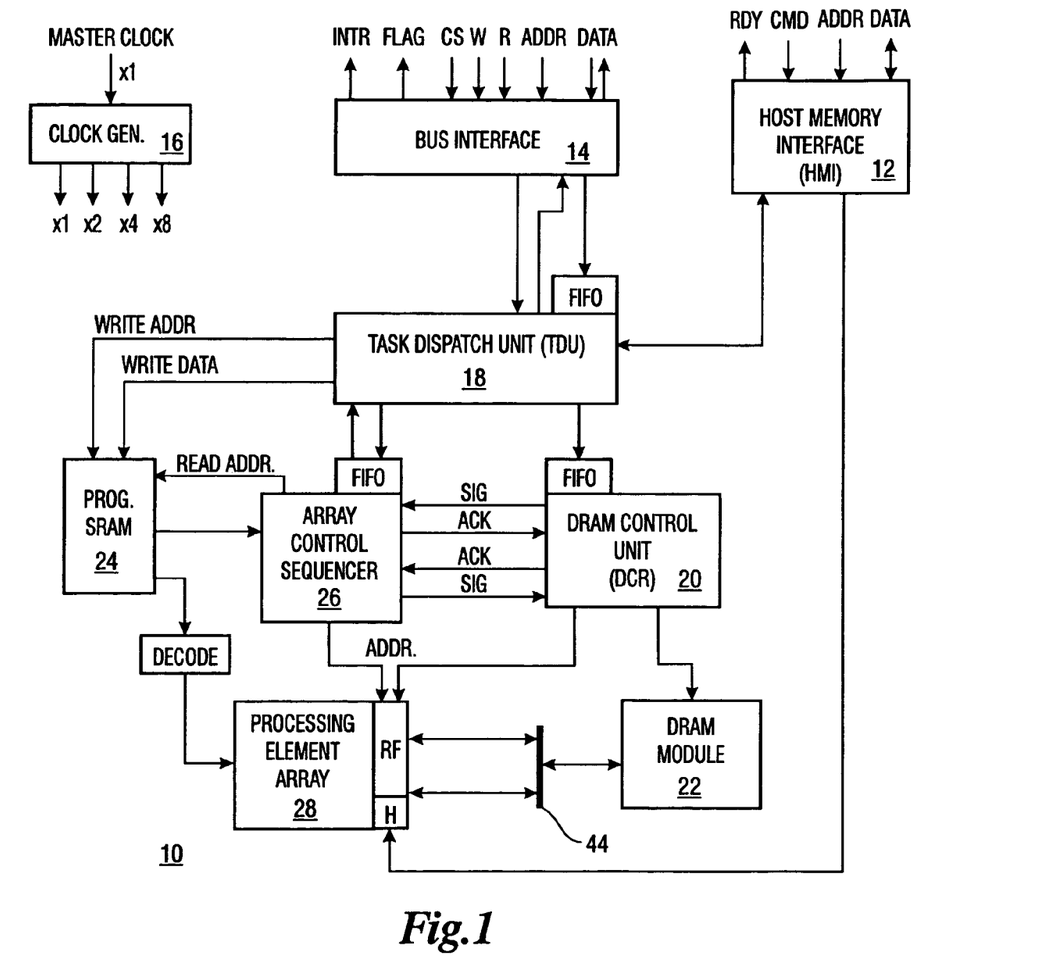
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (×1) and operable to provide the master clock signal (×1) and one or more internal clock signals (×2, ×4, ×8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus providing 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 may be comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. In one embodiment, the processing elements 30 are arranged in a loop (for example, see FIG. 3). The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
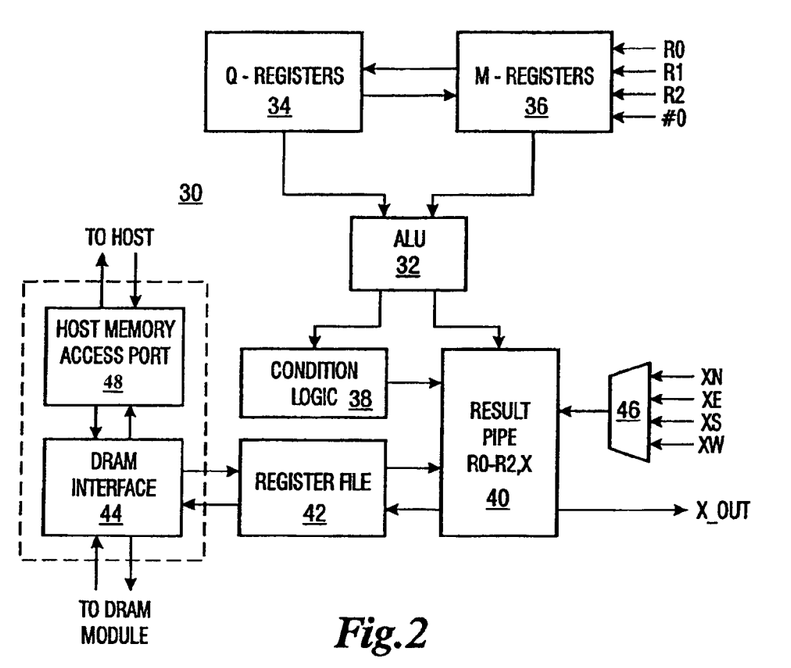
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 46 and logic gates (not shown), among others.

In the current embodiment, the Q-registers 34 are operable to merge data into a floating point format and the M-Registers 36 are operable to de-merge data from a floating point format into a single magnitude plus an exponent format. The ALU 32 is a multiplier-adder operable (among others) to receive information from the Q-registers 34 and M-registers 36, execute tasks assigned by the TDU 18 (see FIG. 1), and transmit results to the shift control and condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface receives command information from the DCU 20. The DRAM interface 44 also permits the PE 30 to communicate with the host through the host memory access port 48.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28. The reader desiring more information about the hardware shown in FIGS. 1 and 2 is directed to UK Patent application No. 0221563.0 entitled "Control of Processing Elements in Parallel Processors" filed 17 Sep. 2002, which is hereby incorporated by reference.

Figure 3:
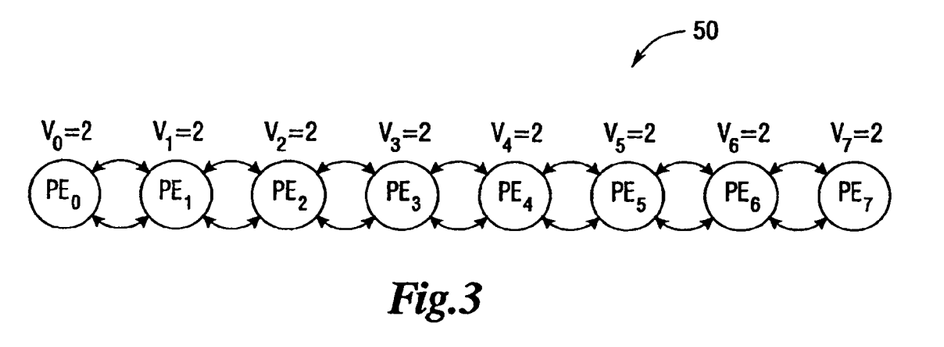
FIG. 3 illustrates an array of the processing elements illustrated in FIG. 2 arranged in a line according to an embodiment of the present invention.

FIG. 3 is a simplified diagram showing the interconnections of an array of PEs 30 (as illustrated in FIG. 2) arranged in a line 50 according to an embodiment of the present invention. In the current embodiment, line 50 is comprised of eight (8) PEs (i.e., $PE_r$, where r=0, 1, 2 ... 7) which are interconnected via their associated X-register links. It should be noted that the number of PEs 30 included in line 50 may be altered while remaining within the scope of the present invention. It should further be noted that although the current embodiment is discussed with respect to a single line of PEs, the present invention is applicable to other arrangements as well. For example, the present invention may be employed for PEs arranged in N×N n-dimensional arrays, one-dimensional loop arrays, hypercubes, butterfly networks, two-dimensional meshes, etc. while remaining with the scope of the present invention. In the current embodiment, each PE 30 in line 50 is operable to receive instructions from TDU 18 as discussed in conjunction with FIG. 1.

As illustrated in FIG. 3, each $PE_r$ has a local number of tasks ($v_r$) associated therewith. For example, $PE_0$, $PE_1$, $PE_2$, ... $PE_7$ each have local number of tasks $v_0=2$, $v_1=2$, $v_2=2$ ... $v_7=2$, respectively, associated therewith. Because each of $PE_0$ through $PE_7$ have the same number of local tasks, the line 50 is said to be balanced.

$PE_1$ through $PE_6$ are operable to communicate with both their left and right neighboring PEs. For example, $PE_1$ can communicate with $PE_0$ (i.e., $PE_1$'s left neighbor) and with $PE_2$ (i.e., $PE_1$'s right neighbor). In the current embodiment, the line's 50 left end PE (i.e., $PE_0$) is operable to communicate with its right neighbor (i.e., $PE_1$), whereas the line's 50 right end PE (i.e., $PE_7$) is operable to communicate with its left neighbor (i.e., $PE_6$). It should be noted, however, that each PE on the end of line 50 (i.e., $PE_0$ and $PE_7$) may also be operable to communicate with a PE from another line (e.g., to link two or more lines in an array) or to communicate with each other (e.g., to permit a wrap function).

It should be noted that "line" refers to at least two serially connected PEs and it is intended to include PE's arranged in a linear array (e.g., rows, columns, diagonals, etc.) and other non-linear shapes. Serially connected arrays having uniform and/or varied distances between one or more of the PEs are within the scope of the present invention.

Figure 4A:
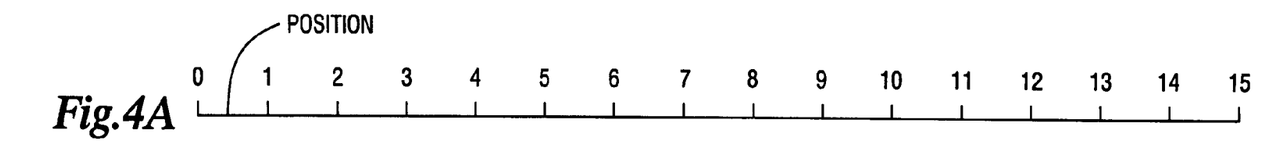
FIGS. 4A-4E illustrate the creation of a key in which the entries of FIG. 4E are the reverse bit order of a serially indexed count from 0 to $2^z$ of FIG. 4A.
Figure 4B:
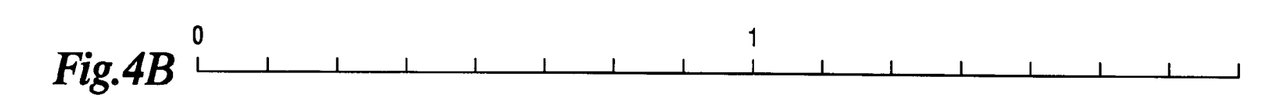
Figure 4C:
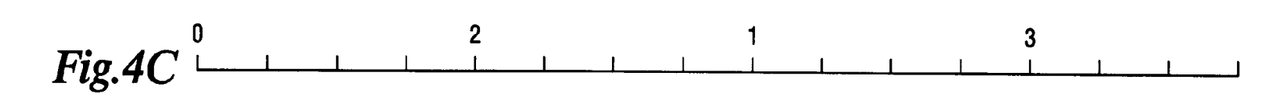
Figure 4D:
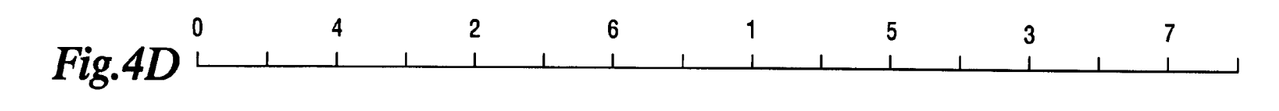
Figure 4E:
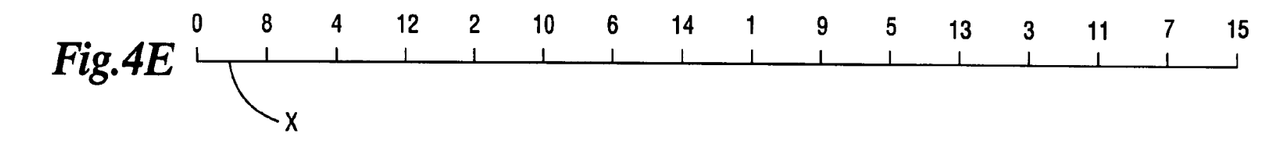

FIGS. 4A through 4E illustrate the creation of a key in accordance with the method of the present invention. FIG. 4A illustrates a serially indexed count from 0 to $2^z$. FIGS. 4B through 4E illustrate a process of numbering positions so that adjacent numbers in FIG. 4A are as far apart as possible. Thus, in FIG. 4B, the numbers 0 and 1 are positioned at the beginning and mid point of the line, respectively. In FIG. 4C, the numbers 2 and 3 are positioned at the one quarter and three quarter locations, respectively. In FIG. 4D, the numbers 4 and 5 are positioned at the one-eighth and five-eighth positions, respectively, while the numbers 6 and 7 are positioned at the four-eighths and seven-eighths positions of the line, respectively. FIG. 4E illustrates the completed process with the line renumbered so that adjacent numbers are as far apart as possible. It can be seen from an examination of FIG. 4E, that if the numbers of FIG. 4A were illustrated in binary form, then the binary form of the numbers illustrated in 4E would be in the reverse bit order of their counterparts in FIG. 4A. For example, the number one appearing in position two of FIG. 4A has the binary form 0001 while the number 8 appearing in position two of FIG. 4E has the binary form 1000.

Figure 5:
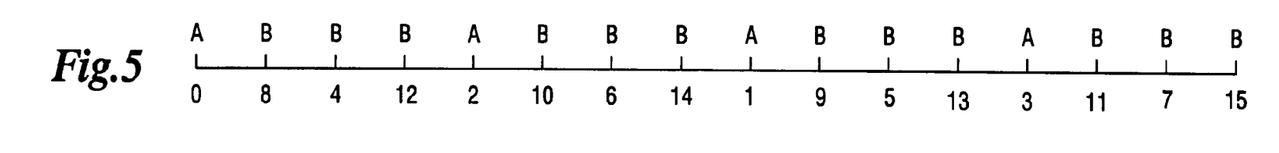
FIG. 5 is an example of the interleave pattern produced by the key of FIG. 4E for the example A=4, B=12.

The renumbered line of FIG. 4E may be thought of as a key comprised of the reverse bit order of a serially indexed count from 0 to $2^z$. An interleave pattern can be generated from the key by substituting A for all values less than n and B for all other values. For example, if n is equal to four lots of A, then A is substituted in the key of FIG. 4E for the values 0, 1, 2, and 3. B is substituted for all other values resulting in the interleave pattern illustrated in FIG. 5. It can be seen from FIG. 5 that the interleave pattern is comprised of four sub-patterns each of which equals A, B, B, B. That sub-pattern approximates the mean value (3B+A)/4.

Figure 6A:
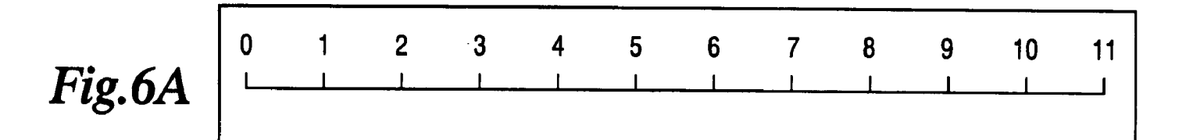
FIGS. 6A-6D illustrate an example of how to construct a key when the n occurrences of A plus the y occurrences of B does not equal a power of two.
Figure 6B:
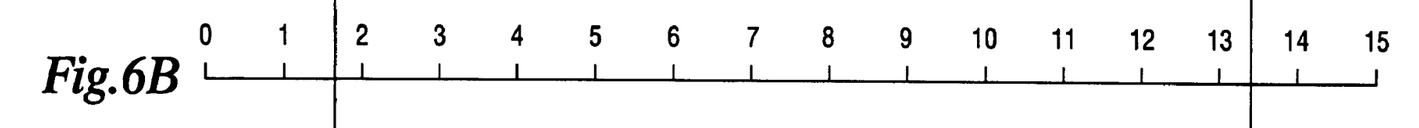
Figure 6C:
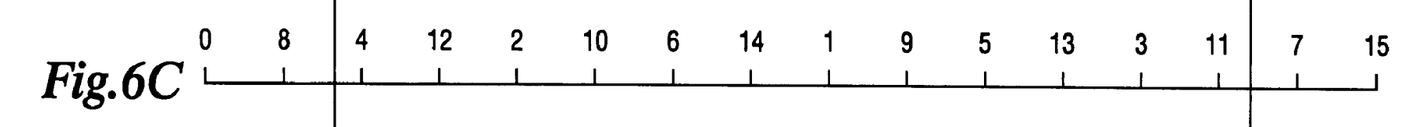
Figure 6D:
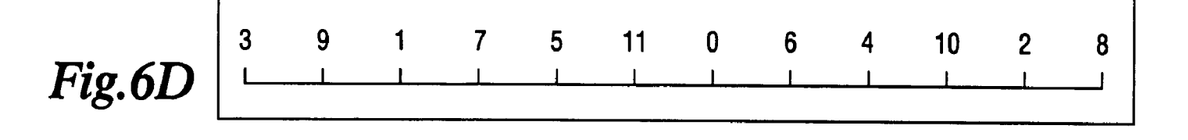

If the sum of n lots of A plus y lots of B is not a power of two, then the next largest power of two is chosen for the initial set of positions. FIG. 6A illustrates a line having twelve positions, which is not a power of two. The next highest power of two is 16, which is shown in FIG. 6B. The line of FIG. 6B is shown centered with respect to the line of FIG. 6A. FIG. 6C shows a list of entries, each of which is the reverse bit order of its counterpart in the line of FIG. 6B. Because only twelve values are needed, FIG. 6D corresponds to a selected portion of FIG. 6C. That is, the line of FIG. 6D is only twelve positions long and it corresponds with the portion of the line of FIG. 6C centered on the line of FIG. 6A. More particularly, the line of FIG. 6D can be arrived at by alternately dropping entries from each end of the line of FIG. 6C. Thereafter, the positions in FIG. 6D are renumbered in ascending order. Thus, the position labeled 1 in FIG. 6C is labeled 0 in FIG. 6D, the position labeled 2 in FIG. 6C is labeled 1 in FIG. 6D, the position labeled 3 in FIG. 6C is labeled 2 in FIG. 6D, etc. to produce the key shown in FIG. 6D.

Figure 7:
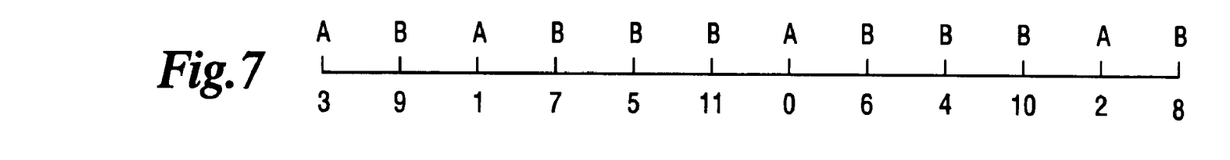
FIG. 7 illustrates the resulting interleave pattern produced by the key of FIG. 6D for the example A=4, B=8.

FIG. 7 illustrates the interleave pattern produced using the key of FIG. 6D for the example where n is equal to four lots of A and y is equal to eight lots of B.

Figure 8:
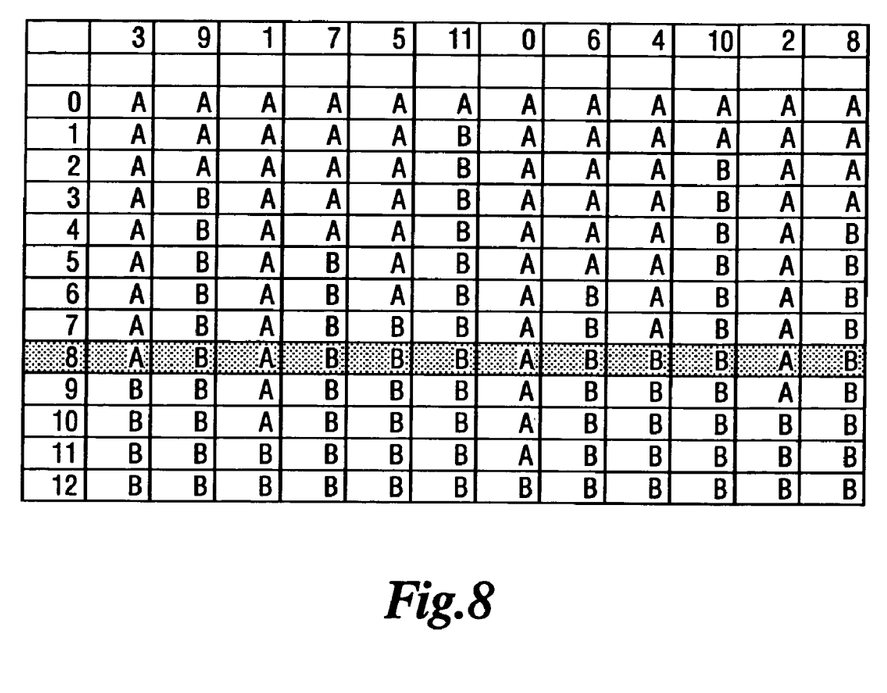
FIG. 8 is a table constructed using the key of FIG. 6D illustrating the interleave patterns for all values of B from 0 to 11.

The keys produced according to the method of the present invention may be used to generate a table. For example, the key shown in FIG. 6D may be used to generate the table shown in FIG. 8 which illustrated the interleave pattern for all combinations of A and B, indexed from B equals 0 to B equal to 12. The highlighted row corresponds to the interleave pattern illustrated in FIG. 7. The table shown in FIG. 8 may be stored such that as an application is presented with different values for n lots of A and y lots of B, the table can be used to automatically select the appropriate interleave pattern. One of the benefits of the present invention is that an optimal, or near optimal, interleave pattern can be produced for most cases utilizing a very simple lookup mechanism, in cases where a table has been created and stored, or using a key to appropriately order the values of A and B.

This invention is particularly useful in combination with load balancing methods. For load balancing, there is a requirement to distribute T tasks across P PEs or, more generally, P processors. This would give a mean number of tasks M=T/P on each processor. However, in general T/P is not an integer. To preserve the number of tasks T, some processors will be assigned A tasks and some processors will be assigned B tasks, where A=truncated (T/P), and B=A+1, and A and B are integers. If the number of processors with A tasks is X, then T=A·X+B·(P−X).

While the present invention has been described in connection with preferred embodiments thereof, those of ordinary skill in the art will recognize that many modifications and variations are possible. The present invention is intended to be limited only by the following claims and not by the foregoing description which is intended to set forth the presently preferred embodiment.

What is claimed is:

1. A method of generating an interleave pattern for n lots of A tasks and y lots of B tasks, where n, y, and z are positive integers, B equals A plus 1, and n plus y does not equal a power of two, comprising:
   creating a list in which the entries are comprised of the reverse bit order of a serially indexed count from 0 to $2^z$;
   selecting a centered portion of the list;
   renumbering the selected portion of the list to form a key;
   generating an interleave pattern corresponding to said key in which all values in the key less than n are replaced by A and all other values in the key are replaced by B; and
   distributing said n lots of A tasks and said y lots of B tasks to a plurality of processing elements according to said interleave pattern to balance the workload across said plurality of processing elements.

2. The method of claim 1 wherein said renumbering includes renumbering in order of ascending value.

3. A method of generating an interleave pattern for n lots of A tasks and y lots of B tasks, where n, y, and z are positive integers, B equals A plus 1, and n plus y does not equal a power of two, comprising:
   creating a list in which the entries are comprised of the reverse bit order of a serially indexed count from 0 to $2^z$;
   selecting a portion of the list by dropping entries alternately from each side of the list;
   renumbering the selected portion of the list to form a key;
   generating an interleave pattern corresponding to said key in which all values in the key less than n are replaced by A and all other values in the key are replaced by B; and
   distributing said n lots of A tasks and said y lots of B tasks to a plurality of processing elements according to said interleave pattern to balance the workload across said plurality of processing elements.

4. The method of claim 3 wherein said renumbering includes renumbering in order of ascending value.

5. A computerized method, comprising:
   creating a key comprised of the reverse bit order of a serially indexed count from 0 to $2^z$;
   creating a table of interleave patterns for all values of n lots of A tasks and ($2^z$−n) lots of B tasks based on said key, where n and z are positive integers and B equals A−1;
   storing said table;
   automatically selecting an interleave pattern from said table based on one of the values n and ($2^z$−n);
   generating an interleave pattern based on said selecting; and
   distributing said n lots of A tasks and said ($2^z$−n) lots of B tasks to a plurality of processing elements according to said generated interleave pattern to balance the workload across said plurality of processing elements.

6. A computerized method, comprising:
selecting a value of $2^z$ which is greater than the value of n lots of A tasks plus y lots of B tasks, where n, y, and z are positive integers and B equals A plus 1, but less than twice that value;
creating a list in which the entries are comprised of the reverse bit order of a serially indexed count from 0 to $2^z$;
selecting a centered portion of the list;
renumbering the selected portion of the list to form a key;
creating a table of interleave patterns for all values of n lots of A and y lots of B based on said key;
storing said table; and
distributing said n lots of A tasks and said y lots of B tasks to a plurality of processing elements according to said stored table to balance the workload across said plurality of processing elements.

7. The method of claim 6 wherein said renumbering includes renumbering in order of ascending value.

8. A computerized method, comprising:
selecting a value of $2^z$ which is greater than the value of n lots of A tasks plus y lots of B tasks, where n, y, and z are positive integers and B equals A plus 1, but less than twice that value;
creating a list in which the entries are comprised of the reverse bit order of a serially indexed count from 0 to $2^z$;
selecting a portion of the list by dropping entries alternately from each side of the list;
renumbering the selected portion of the list to form a key;
creating a table of interleave patterns for all values of n lots of A and y lots of B based on said key;
storing said table; and
distributing said n lots of A tasks and said y lots of B tasks to a plurality of processing elements according to said stored table to balance the workload across said plurality of processing elements.

9. The method of claim 8 wherein said renumbering includes renumbering in order of ascending value.

10. A computerized method, comprising:
selecting a value of $2^z$ which is greater than the value of n lots of A tasks plus y lots of B tasks, where n, y, and z are positive integers and B equals A plus 1, but less than twice that value;
creating a list in which the entries are comprised of the reverse bit order of a serially indexed count from 0 to $2^z$;
selecting a portion of the list;
creating a table of interleave patterns for all values of n lots of A and y lots of B based on said key;
storing said table;
automatically selecting an interleave pattern from said table based on one of the values n and y;
generating an interleave pattern based on said selecting; and
distributing said n lots of A tasks and said y lots of B tasks to a plurality of processing elements according to said generated interleaved pattern table to balance the workload across said plurality of processing elements.

11. A computer memory device storing a set of instructions which, when executed, performs a method of generating an interleave pattern for n lots of A tasks and y lots of B tasks, where n, y, and z are positive integers, B equals A plus 1, and n plus y does not equal a power of two, said method comprising:
creating a list in which the entries are comprised of the reverse bit order of a serially indexed count from 0 to $2^z$;
selecting a centered portion of the list;
renumbering the selected portion of the list to form a key;
generating an interleave pattern corresponding to said key in which all values in the key less than n are replaced by A and all other values in the key are replaced by B; and
distributing said n lots of A tasks and said y lots of B tasks to a plurality of processing elements according to said interleave pattern to balance the workload across said plurality of processing elements.

12. A computer memory device storing a set of instructions which, when executed, performs a method of generating an interleave pattern for n lots of A tasks and y lots of B tasks, where n, y, and z are positive integers, B equals A plus 1, and n plus y does not equal a power of two, said method comprising:
creating a list in which the entries are comprised of the reverse bit order of a serially indexed count from 0 to $2^z$;
selecting a portion of the list by dropping entries alternately from each side of the list;
renumbering the selected portion of the list to form a key;
generating an interleave pattern corresponding to said key in which all values in the key less than n are replaced by A and all other values in the key are replaced by B; and
distributing said n lots of A tasks and said y lots of B tasks to a plurality of processing elements according to said interleave pattern to balance the workload across said plurality of processing elements.

13. A computer memory device storing a set of instructions which, when executed, performs a method comprising:
creating a key comprised of the reverse bit order of a serially indexed count from 0 to $2^z$;
creating a table of interleave patterns for all values of n lots of A tasks and ($2^z$-n) lots of B tasks based on said key, where n and z are positive integers and B equals A+1;
storing said table;
automatically selecting an interleave pattern from said table based on one of the values n and ($2^z$-n);
generating an interleave pattern based on said selecting; and
distributing said n lots of A tasks and said ($2^z$-n) lots of B tasks to a plurality of processing elements according to said generated interleave pattern to balance the workload across said plurality of processing elements.

14. A computer memory device storing a set of instructions which, when executed, performs a method comprising:
selecting a value of $2^z$ which is greater than the value of n lots of A tasks plus y lots of B tasks, where n, y, and z are positive integers and B equals A plus 1, but less than twice that value;
creating a list in which the entries are comprised of the reverse bit order of a serially indexed count from 0 to $2^z$;
selecting a centered portion of the list;
renumbering the selected portion of the list to form a key;
creating a table of interleave patterns for all values of n lots of A and y lots of B based on said key;
storing said table; and
distributing said n lots of A tasks and said y lots of B tasks to a plurality of processing elements according to said stored table to balance the workload across said plurality of processing elements.

15. A computer memory device storing a set of instructions which, when executed, performs a method comprising:
selecting a value of $2^z$ which is greater than the value of n lots of A tasks plus y lots of B tasks, where n, y, and z are positive integers and B equals A plus 1, but less than twice that value;
creating a list in which the entries are comprised of the reverse bit order of a serially indexed count from 0 to $2^z$ where z is an integer;

selecting a portion of the list by dropping entries alternately from each side of the list;

renumbering the selected portion of the list to form a key;

creating a table of interleave patterns for all values of n lots of A and y lots of B based on said key;

storing said table; and distributing said n lots of A tasks and said y lots of B tasks to a plurality of processing elements according to said stored table to balance the workload across said plurality of processing elements.

16. A computer memory device storing a set of instructions which, when executed, performs a method, comprising:

selecting a value of $2^z$ which is greater than the value of n lots of A tasks plus y lots of B tasks, where n, y, and z are positive integers and B equals A plus 1, but less than twice that value;

creating a list in which the entries are comprised of the reverse bit order of a serially indexed count from 0 to $2^z$;

selecting a portion of the list;

creating a table of interleave patterns for all values of n lots of A and y lots of B based on said key;

storing said table;

automatically selecting an interleave pattern from said table based on one of the values n and y;

generating an interleave pattern based on said selecting; and distributing said n lots of A tasks and said y lots of B tasks to a plurality of processing elements according to said generated interleaved pattern table to balance the workload across said plurality of processing elements.

* * * * *

UNITED STATES PATENT AND TRADEMARK OFFICE
CERTIFICATE OF CORRECTION

| | |
|---|---|
| PATENT NO. | : 7,503,046 B2 |
| APPLICATION NO. | : 10/689280 |
| DATED | : March 10, 2009 |
| INVENTOR(S) | : Beaumont |

It is certified that error appears in the above-identified patent and that said Letters Patent is hereby corrected as shown below:

On the title page, item (57), under "Abstract", in column 2, line 7, delete "replace" and insert -- replaced --, therefor.

In column 1, line 10, delete "10/689,335" and insert -- 10/689,355 --, therefor.

In column 8, line 58, in Claim 5, delete "A-1;" and insert -- A+1; --, therefor.

In column 10, line 44, in Claim 14, delete "$2^z$which" and insert -- $2^z$ which --, therefor.

In column 10, line 66, in Claim 15, delete "$2^z$" and insert -- $2^z$, --, therefor.

Signed and Sealed this

Twenty-third Day of June, 2009

JOHN DOLL
*Acting Director of the United States Patent and Trademark Office*